Dec. 9, 1969  A. F. HICKMAN  3,482,852
HEAVY DUTY VEHICLE SPRING SUSPENSION
Filed May 25, 1967  3 Sheets-Sheet 2
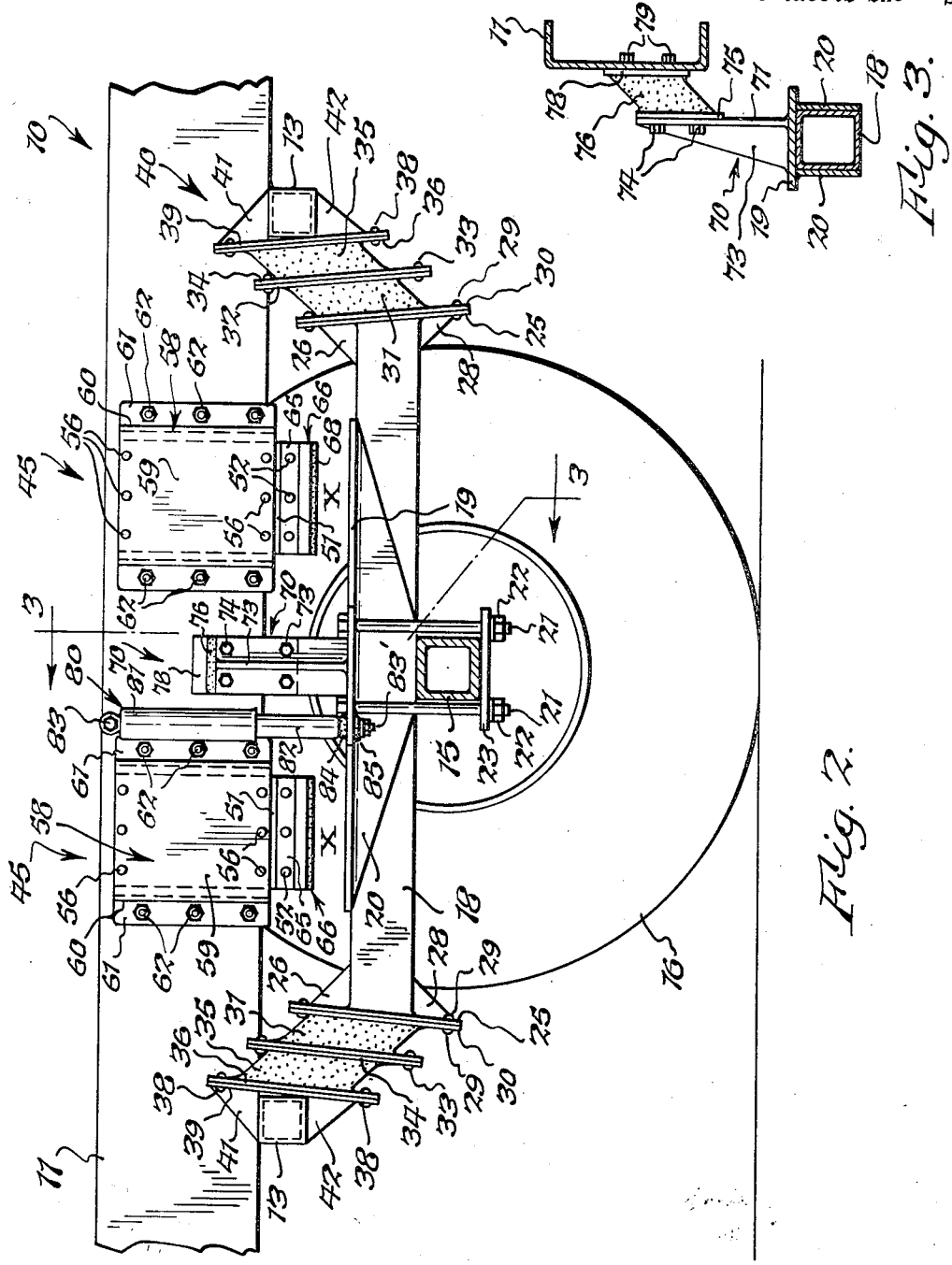
INVENTOR.
Albert F. Hickman
BY
Popp and Sommer
ATTORNEYS.

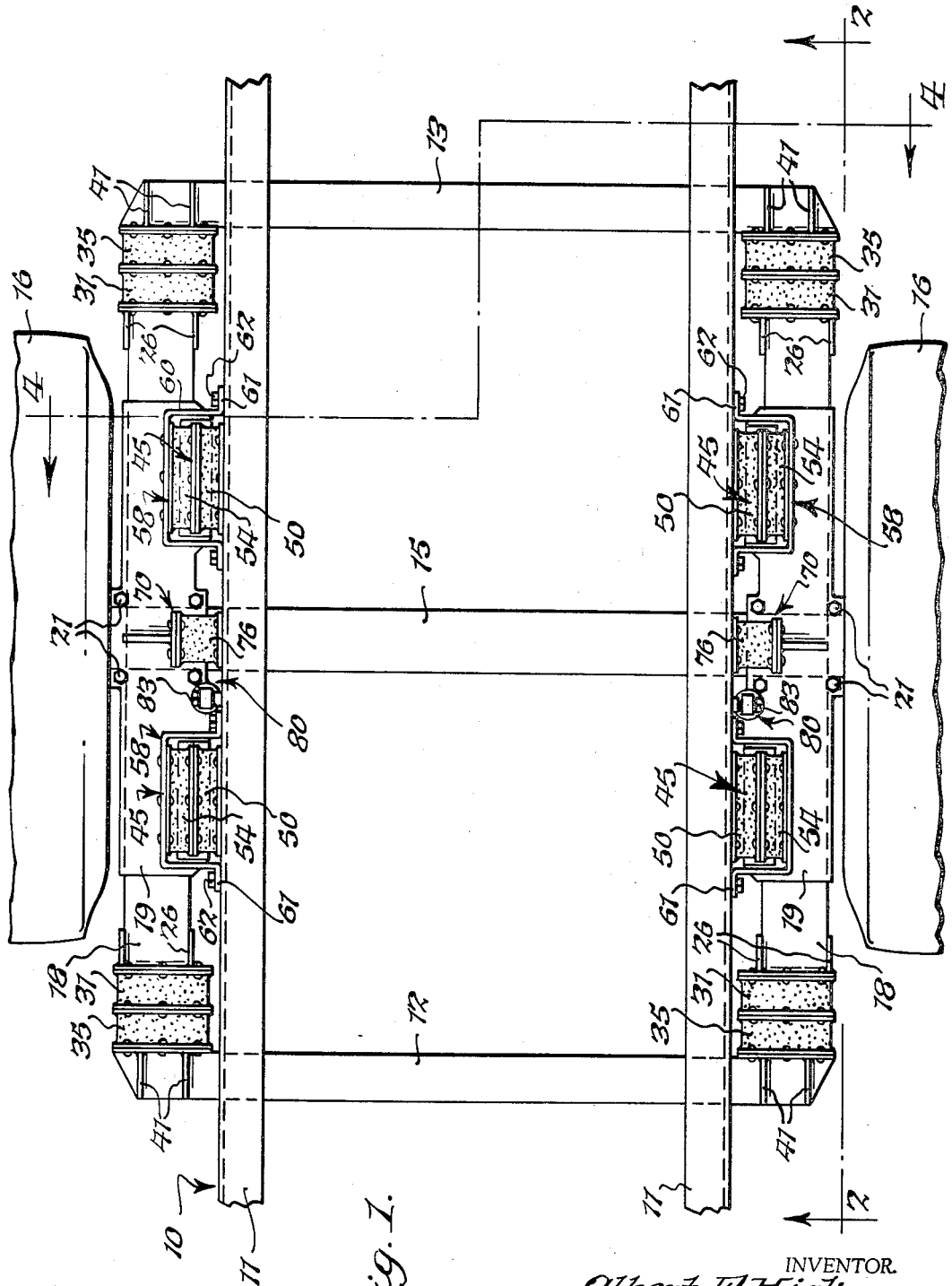

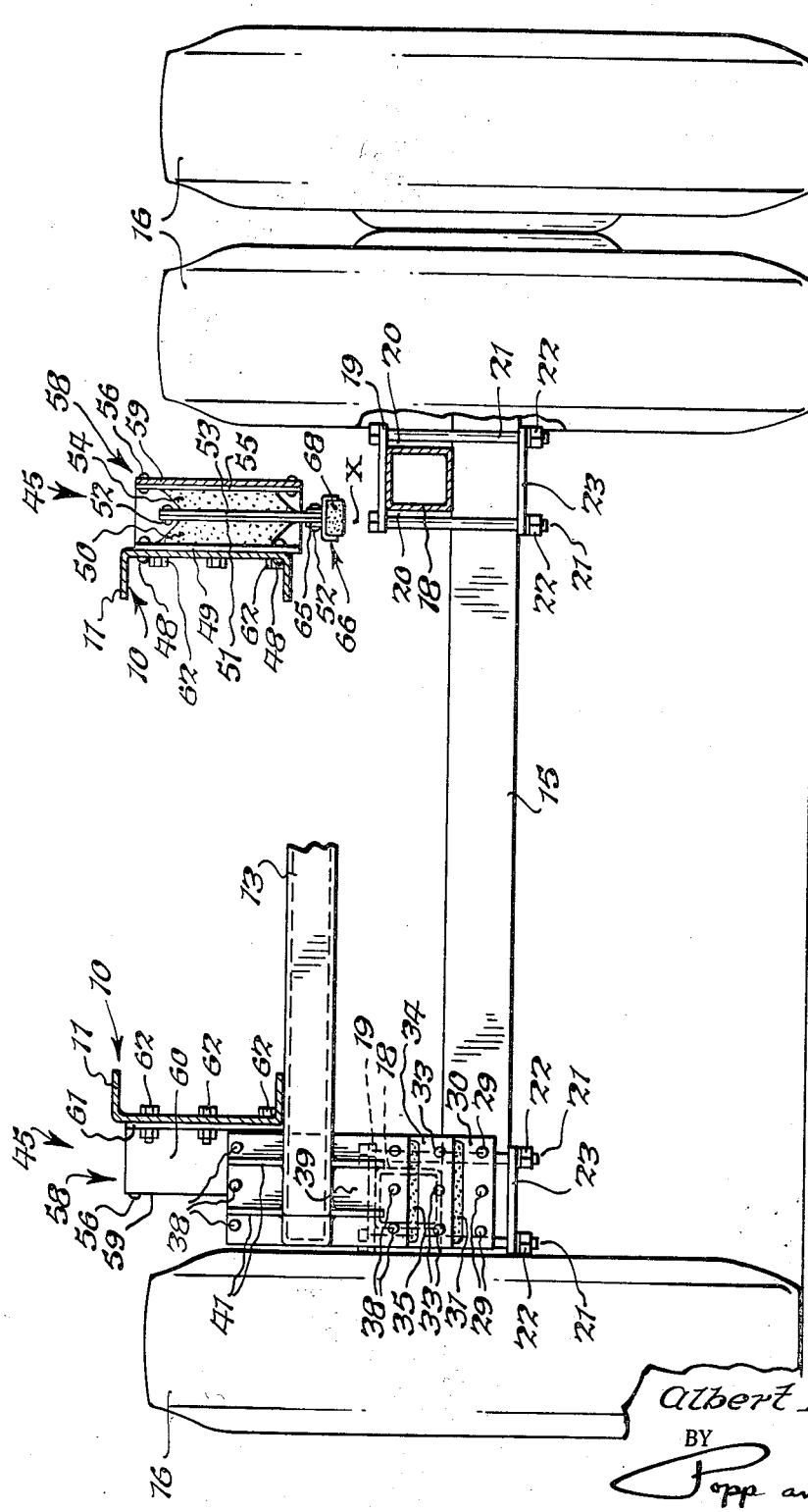

United States Patent Office 3,482,852
Patented Dec. 9, 1969

3,482,852
HEAVY DUTY VEHICLE SPRING SUSPENSION
Albert F. Hickman, Eden, N.Y., assignor to Hickman Developments, Inc., Eden, N.Y., a corporation of New York
Filed May 25, 1967, Ser. No. 641,000
Claims priority, application Great Britain, June 16, 1966, 26,916/66
Int. Cl. B60g 1/02, 11/00
U.S. Cl. 280—124                    5 Claims

ABSTRACT OF THE DISCLOSURE

A two stage spring suspension for a vehicle has a first stage vertically flexing spring structure fixed at its center to the axle and extending lengthwise of the line of vehicle travel to points beyond the vehicle wheel, and at which points it is attached to the frame. The second stage spring is at least one vertically flexible, rectilinear movement shear rubber block fixed at one of its sides to the frame above the first stage spring structure and having a bumper fixed to its other side and in the path of the first stage spring structure but out of engagement therewith when the frame is empty. Such engagement occurs as the frame is loaded so as to bring the second stage spring into action.

---

Important objects are to provide, within the limited space available, such a suspension which will permit the large amount of vertical axle movement to provide a low frequency ride as soft as load heights will allow; which provides a highly resilient low frequency empty vehicle ride; which provides resiliently resisted vertical, vertical angular and a slight amount of longitudinal and lateral axle movement with reference to the frame; for which no lubrication is required; which will stand up many years and miles of use without service; in which the frame is cradled at widely spaced points to reduce frame stresses; which is light in weight, particularly unsprung weight; which is free from friction but can be controlled by an increasing resistance in proportion to amplitude and velocity of vertical frame movement; which provides a much wider spring base than that provided by conventional leaf springs; which renders auxiliary sidesway control devices, such as torsion bar stabilizers, unnecessary; in which periodic vibration and wheel tramp is avoided; which is low in cost; and in which bond stress of the rubber bodies is kept within safe working limits.

A specific object of the present invention is to provide a simple and effective arrangement of two groups of springs, both of the rectilinear movement shear rubber type, in which a first stage group serves to support the empty body and provide desirable ride characteristics under these conditions and in which a second-stage group comes into action when the body is loaded and provide desirable ride characteristics under all load conditions.

Another specific object is to reduce the weight requirements of the metal parts of the suspension by arranging the light duty first stage springs at widely spaced positions from the axle but to arrange the heavy duty second stage springs close to the axle.

Another object is to provide a heavy duty second stage spring construction which is compact and provides the required powerful friction free resistance without excessive stress on any part.

Another object is to provide a simple, effective and noiseless sidesway control for the body, whether empty or loaded.

Another object is to reduce weight of the suspension without sacrifice of strength this being achieved by the use of a light truss for empty vehicle riding applying the secondary heavy duty springs to a central reinforced section of such light truss; and connecting these secondary heavy duty springs directly to the main longitudinal side beams of the vehicle frame.

FIG. 1 is a top plan view of a suspension embodying the present invention. FIG. 2 is a vertical longitudinal section taken generally on line 2—2, FIG. 1. FIG. 3 is a fragmentary transverse section taken generally on line 3—3, FIG. 2 and FIG. 4 is a vertical fragmentary transverse section taken generally on line 4—4, FIG. 1.

The main frame 10 of the vehicle body can be of any suitable construction and is shown as comprising a pair of main longitudinal side frame bars in the form of inwardly opening channels 11 which are shown as straight and parallel and connected by the tubular cross bars 12 and 13 which form part of the suspension as hereinafter described. The entire vehicle chassis, together with the spring suspension, is constructed substantially symmetrically about a vertical longitudinal medial plane and hence it is deemed sufficient to confine the following detailed description to one rear side of the vehicle, it being understood that this description and the same reference numerals apply to the opposite rear side of the vehicle.

The rear end of the vehicle frame 10 is supported on a rear or drive axle housing 15 in turn supported by rubber tired drive wheels 16 at its opposite ends, the wheels being fast to the usual pair of rear drive axles (not shown). The term "wheels" as used herein includes the rubber tires thereof and the term "axle" as used herein includes the housing 15 thereof.

On each end of the drive axle housing 15, externally of the corresponding main longitudinal side frame bar 11, is mounted a rigid horizontal metal beam or truss 18 which extends lengthwise of the line of movement of the vehicle parallel with and in a horizontal plane below and in vertical planes outside of the longitudinal side frame bars 11. Each beam or truss is preferably of rectangular tubular form in cross section and is reinforced at its center by a welded metal top plate 19 which extends part way to the opposite ends thereof but terminates a substantial distance short of these ends. Each side of each truss or beam 18 is reinforced by a metal side plate 20 welded thereto, the ends of these side plates being of triangular shape, extending from the ends of the top plate 19 to a point close to the drive axle housing 15. The top plate 19 is preferably wider than its truss or beam 18 and its central overhanging or laterally projecting portions have spaced holes through which a pair of vertical bolts 21 extend. The lower threaded ends of these bolts carry nuts 22 which hold a clamping plate 23 against the underside of the adjacent end of the drive axle housing 15 thereby to rigidly secure each truss or beam 18 to the corresponding end of the axle housing 15. The ends of the top plate 19 each forms a metal bumper member for engagement with a corresponding resilient bumper member, which corresponding bumper members, as hereinafter described, are in spaced relation to each other in the unloaded condition, illustrated, of the vehicle frame 10.

Across each end of each truss or beam 18 is welded a vertically elongated inner rectangular metal plate 25 which extends transversely of and forms an end plate for the corresponding end of the truss 18 and has its upper and lower ends reinforced by welded triangular ribs or braces 26, 28 which are also welded to the truss or beam. These plates 25 are arranged at a slight angle to the vertical such that the plates 25 at opposite ends of each truss or beam 18 converge upwardly toward a center above the axle housing 15.

To the outer face of each of these rectangular plates 25 opposite from the truss or beam 18 is secured, as by bolts or rivets 29 a vertically elongated rectangular metal plate 30, preferably of the same size and shape as the plate 25. To the face of each of the rectangular metal plates 30 opposite from the beam or truss 18 is vulcanized a rubber body 31. This rubber body is preferably of generally rectangular vertical section transversely of the line of movement of the vehicle, but is of parallelogram vertical section lengthwise of the line of travel of the vehicle, its upper and lower faces inclining upwardly from the plate 30 in the unloaded condition illustrated. The opposite face of each of these rubber bodies 31 is vulcanized to a vertically elongated rectangular metal plate 32 which is connected by bolts or rivets 33 to a similar rectangular metal plate 34. To the opposite face of each rectangular metal plate 34 is vulcanized a rubber body 35, preferably of the same size and shape as the rubber body 31. The opposite face of each rubber body 35 is vulcanized to a similar rectangular metal plate 36.

Each rectangular metal plate 36 is attached, as by rivets or bolts 38, to the face of an outer rectangular metal plate 39 which forms part of a frame bracket 40, these plates 39 for each axle end, being generally parallel with their companion plates 25, 30, 32, 34 and 36 and hence converging upwardly toward a center above the axle housing 15. Each outer rectangular plate 39 is welded or otherwise suitably secured to the side of the end of the tubular cross beam 13 projecting horizontally outwardly from under the corresponding main longitudinal side frame beam 11. Each tubular cross beam 13 bridges the space between the main longitudinal side frame bars 11 of the vehicle frame; is preferably of rectangular form in cross section, and is secured to the underside of each main longitudinal side frame bar 11 in any suitable manner. Each outer end plate 39 is preferably reinforced by triangular ribs or braces 41, 42 which are also welded to the tubular cross beam 13.

The four rubber bodies 31, 35 supporting the main frame 10 on each end of the axle housing 15 are the first stage springs which provide the resilient resistance or support for empty body travel, and to provide the required additional resilient resistance for the loaded vehicle, two groups 45 of heavy duty second stage springs are provided at each end of the axle housing 15, each group of these second stage springs being constructed as follows:

To the vertical outside faces of each main longitudinal side frame bar 11, above the outer end of each top and side plate 19 and 20 reinforcing the center part of the corresponding tubular truss or beam 18 is secured, as by rivets or bolts 48, a vertically elongated rectangular metal side plate 49. To the opposite face of each of the rectangular side plates 49 is vulcanized a rubber body 50 which is generally rectangular in vertical section lengthwise of the line of movement of the vehicle but which is of parallelogram vertical section transversely of the line of movement of the vehicle, its top and bottom faces sloping downwardly and outwardly from its plate 49. The opposite face of each of these rubber bodies is vulcanized to a vertically elongated rectangular metal plate 51 which is connected by upper and lower rows of rivets or bolts 52 to a companion vertical rectangular metal plate 53. To the opposite face of each of these rectangular metal plates 53 is vulcanized a rubber body 54. Each of these rubber bodies is preferably generally rectangular in vertical section lengthwise of the travel of the vehicle, but is of parallelogram vertical section transversely of the line of movement of the vehicle, its upper and lower faces sloping upwardly and outwardly from its plate 53. To the outer vertical face of each rubber body is vulcanized a generally rectangular metal plate 55 secured by upper and lower horizontal rows of rivets or bolts 56 to a U-shaped housing bracket indicated generally at 58.

Each housing bracket 58 has its central part 59 in face-to-face relation with its plate 55 and secured thereto by the rivets or bolts 56 and has its opposite fore-and-aft ends formed to provide legs 60 projecting toward the vehicle frame 10 and terminating in outwardly projecting flanges 61 which are arranged in face-to-face relation with the outside vertical face of the corresponding main longitudinal side bar 11. Each of these side flanges 61 are secured to these main longitudinal side frame bars by a vertical series of bolts 62 and it is a feature of the invention that these bolts hold each housing bracket 58 in compressive relation with the rubber bodies 50 and 54 contained therein.

Each of these housing brackets 58 is open at its bottom and preferably at its top and each companion pair of plates 51 and 53 projects downwardly below the bracket, their lower row of connecting rivets or bolts 52 also serving to secure the upstanding side flanges 65 of a downwardly opening channel-shaped foot 66 which extends lengthwise of each pair of plates 51, 53. A rubber bumper 68 is secured within each of these channel-shaped feet and is arranged to engage the top face of the adjacent end of the companion top plate 19 of each truss 18, the overhang of these top plates permitting such engagement.

In the unloaded position of the vehicle shown, a space, indicated at X, exists between the bottom of each rubber bumper 68 and the top face of the companion top plate 19 therebelow, this space being, say, in the order of two inches.

Means are provided for resiliently limiting lateral movement of the vehicle frame 10 in relation to the axle housing 15, these means being preferably constructed as follows:

The numeral 70 represents an upstanding bracket at the center of each top plate 19 of each truss or beam 18 directly above the corresponding axle end, this bracket comprising a rectangular plate 71 arranged parallel with and in outwardly spaced relation to the outside face of of corresponding main longitudinal side frame bar 11 and having a central triangular rib or brace 73 also welded at its lower end to the center of the top plate 19. To the upper end of the upstanding plate 71 of the bracket 70 is secured, as by corner rivets or bolts 74, a rectangular plate 75, this being interposed between the bracket 70 and the companion main longitudinal side frame bar 11 as best shown in FIG. 3. To the opposite face of each of the rectangular plates 75 is vulcanized a rubber body 76. This rubber body is preferably of generally rectangular vertical section lengthwise of the line of travel of the vehicle but is of parallelogram vertical section transversely of the line of travel of the vehicle, its upper and lower faces, in the unloaded condition of the vehicle, sloping upwardly and inwardly toward the center of the vehicle. The opposite face of each of these rubber bodies is vulcanized to a vertical elongated rectangular metal plate 78 which is connected by corner bolts 79 to the side of the companion main longitudinal side bar 11.

The rubber body 76 of each sidesway control spring 70 is located as high as practicable so as not to interfere with any body members (not shown) when the maximum load is carried by the vehicle frame 10 and the vehicle frame bottoms under maximum shock conditions. By connecting these rectilinear shear rubber bodies 76 to the axles, they remain at a constant height with reference to the ground so that as the payload increases and as the vehicle frame 10 moves downwardly, the rubber bodies of these shear rubber springs 70 become increasingly effective in sidesway control since their elevation in relation to the center of gravity of the sprung mass increases. This is in distinct contrast to a leaf spring suspension where the ends of the springs move downwardly as the load is applied. It will be seen that by arranging these rectilinear shear rubber bodies directly over the axles no eccentric forces are created when they come into action and also these shear rubber bodies are not subjected to excessive shear forces and can be of the small size shown since their essential function is in a horizontal direction transversely of the line of movement of the vehicle and hence in compression.

Desirably shock absorber control is provided to prevent the start and development of a body roll frequency or oscillation. To this end a telescoping type of hydraulic shock absorber 80 is interposed between each truss or beam 18, near the center thereof, and the vehicle body 10. Each shock absorber can be of conventional construction and includes an outer telescoping member 81 and an inner telescoping member 82. Each shock absorber is arranged to act vertically and for this purpose its upper end is secured, as by means of a bolt 83, to the upper part of the companion main longitudinal side beam 11 and its lower part is secured, as by means of an axially extending threaded end 83' and rubber bushings 84 and 85 through an opening in the lateral extension of the top reinforcing plate 19 for the truss 18. Desirably the nut for the securement holds this extension 83' under compression between the two rubber cushions 84 and 85 to permit movement of the adjacent axle end in any direction to the degree permitted by the rectilinear movement shear rubber bodies.

OPERATION

The drawings illustrate the position of the parts when the vehicle is on the ground but empty. In this unloaded condition of the vehicle body 10 traveling along the roadway, an upward force against either wheel 16 caused by a bump in the highway will move the corresponding end of the axle housing 15 and its attached truss or tubular beam 18 upwardly, this movement being resiliently resisted at the opposite ends of the truss by the first stage light duty rectilinear shear rubber bodies 31 and 35. These first stage bodies are distorted upwardly from a parallelogram into a more nearly rectangular sectional shape lengthwise of the line of movement of the vehicle and serve to provide a desirable low frequency empty body ride.

With such empty body ride, the first stage rectilinear movement shear rubber bodies 31 and 35 are fully effective in providing sidesway control.

When load is applied, these first stage rectilinear movement spring bodies 31 and 35 are distorted upwardly until the two rubber bumper pads 68 engage the ends of upper faces of the bumper ends of the metal top plates 19. Further loading and further upward axle forces due to encountering a bump in the road will thereupon be transmitted to the loaded vehicle frame 10 through the center plates 51 and 53 of each pair of heavy duty or second stage rectilinear movement shear rubber bodies 50 and 54. When this occurs these rubber bodies are distorted upwardly toward a more nearly rectangular section, transversely of the line of movement of the vehicle from that shown in FIG. 4. Under extreme conditions the direction of slope of the parallelogram shown in this FIG. 4 will be reversed and the plates 51 and 53 will project above the U-shaped frame bracket 58. It will be noted that this U-shaped frame bracket 58 holds these rubber bodies 50 and 54 under compression transversely of the line of movement of the vehicle to insure direct upward movement of the plates 51 and 53 and avoid any forces tending to pull the rubber bodies away from their vulcanized bonds.

It will also be noted that at this time the sidesway control shear rubber bodies 76 are of increased effectiveness in controlling sidesway since as the body settles under the load, the effective height of these shear rubber bodies, with reference to the ground, remains constant so that the elevation in relation to the center of gravity of the sprung mass is lowered.

It will also be noted that the heavy duty shear rubber second stage springs 45 at each side of the vehicle frame 10 are located very near the axle thereby applying heavy loads on the trusses or beams 18 close to the axle and at the point where the truss or beam is reinforced by the simple side and top plates 19, and 20, thereby to permit a decided saving in truss weight. It will also be noted that these heavy duty second stage springs 45 are each in the form of a pair of rubber bodies 50 and 54 one 50 of which is secured directly to the side of vehicle frame 10 and the other one 54 of which is secured to the vehicle frame by the enveloping bracket 58. These brackets are open at their upper and lower ends to permit full vertical movement of these rubber bodies. Here again a weight saving is achieved, one side of the pair of springs, being bolted directly to the frame 10 so that only a very light U-shaped bracket 58 is required.

The sidesway or lateral control springs 70-79 are light duty shear rubber springs to provide a good empty vehicle ride but at the same time provide adequate lateral or sidesway control since this type of rubber spring can accommodate much larger capacity loads per square inch in compression than in shear.

As to the action of the light duty first stage springs 30-38 and the heavy duty second stage springs 45, it is desirable that they be designed so as to have the first stage much lighter than the second stage springs and at the same time capable of controlling the heavy rear axle torsional, lateral and longitudinal forces at all times. Both stages relieve the vehicle body and the load of the steady flow of high frequency vibrations resulting from road irregularities and the powerful gyroscopic forces caused by the angular movement of the heavy rear wheels 16 every time only one end of the axle 15 rises. With the suspension as described, a superior non-destructive ride for the life of the truck, barring accidents, can be anticipated without maintenance, service or lubrication, except for replacement of the shock absorbers at 100,000 mile intervals, these shock absorbers preferably being single axle shock absorbers with resistence only against recoil forces.

By "rubber" as used in the foregoing specification is meant both natural rubber and synthetic rubber as well as mixtures of natural and synthetic rubber.

I claim:

1. A vehicle spring suspension interposed between the frame structure of a highway vehicle and an axle structure having a wheel journalled thereon, and the suspension including an empty body supporting, first stage, generally horizontal, vertically flexing relatively light duty spring means fixed intermediate its ends to said axle and extending lengthwise of the line of travel of the vehicle with its fore and aft ends respectively extending to positions proximate the corresponding front and rear extremities of said wheel, and means connecting said fore and aft ends of said first stage spring means to said vehicle frame structure, wherein the improvement comprises a second stage vertically flexing relatively heavy duty spring means intermediate said front and rear extremities of said wheel, said second stage having resilient resistance sufficient to provide desirable ride characteristics for the load on said frame structure and comprising a first bumper member fixed with reference to one of said structures, at least one second stage vertically flexible rectilinear movement shear rubber block having one vertical side extending lengthwise of the line of travel of the vehicle and fixed with reference to the other of said structures, the opposite vertical face of said rubber block being generally parallel with its said one face, a metal face member fixed to said opposite vertical side of said shear rubber block adjacent said metal bumper member, second bumper member fixed to said metal face member in the path of said first bumper member, said bumper members being in load transmitting contact with each other when the frame structure is loaded thereby to provide the additional resilient support of said shear rubber block for the load on said frame structure.

2. A vehicle spring suspension as set forth in claim 1 wherein a pair of said second stage rubber blocks are provided with their said opposite vertical sides opposing each other and each joined to a common face plate member projecting downwardly therefrom in a plane extending lengthwise of such line of travel, and wherein said second bumper member is connected to the bottom of said common face plate member.

3. A vehicle spring suspension as set forth in claim 2 wherein said second stage rubber blocks are fixed to said frame structure by means of a bracket which is U-shaped in horizontal section and compresses them against their said common plate member.

4. A vehicle spring suspension as set forth in claim 1 additionally including a rectilinear movement shear rubber spring for control of sidesway, comprising a sidesway control, vertically flexible shear rubber body having opposite broad faces extending lengthwise of the line of movement of the vehicle, means securing one of said broad faces to said vehicle frame structure directly above said axle structure and means securing the other of said broad faces to said axle structure.

5. A vehicle spring suspension as set forth in claim 4 wherein said last mentioned means comprises an axle bracket rising from said axle structure and to the upper end of which the other of said broad faces is secured, whereby said sidesway control shear rubber body is located at a high elevation with reference to the center of gravity of the vehicle frame structure.

References Cited

UNITED STATES PATENTS

| 3,220,746 | 11/1965 | Francis | 267—21 X |
| 2,752,166 | 6/1956 | Hickman | 280—124 |

PHILIP GOODMAN, Primary Examiner

U.S. Cl. X.R.

267—21